(12) United States Patent
Hillmann et al.

(10) Patent No.: US 8,768,503 B2
(45) Date of Patent: *Jul. 1, 2014

(54) METHOD FOR THE DESIGNING OF TOOLS (75) Inventors: Matthias Hillmann, Zürich (CH); Waldemar Kubli, Niederglatt (CH)

(73) Assignee: Autoform Engineering GmbH, Niederglatt (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,657

(22) Filed: Apr. 10, 2012

(65) Prior Publication Data

US 2012/0197602 A1     Aug. 2, 2012

Related U.S. Application Data

(63) Continuation of application No. 13/032,098, filed on Feb. 22, 2011, now Pat. No. 8,155,777, which is a continuation of application No. 10/275,633, filed as application No. PCT/CH01/00292 on May 11, 2001, now Pat. No. 7,894,929.

(30) Foreign Application Priority Data

May 11, 2000   (CH) .......................................... 917/00

(51) Int. Cl.
  *G06F 19/00*   (2011.01)
  *G06F 17/50*   (2006.01)
  *G06F 7/48*    (2006.01)

(52) U.S. Cl.
  USPC ................. 700/145; 700/97; 700/111; 703/1; 703/6

(58) Field of Classification Search
  USPC .............................. 700/97.117, 145; 703/1, 6
  See application file for complete search history.

(56) References Cited

U.S. PATENT DOCUMENTS

| | | | |
|---|---|---|---|
| 2,064,160 A | 12/1936 | Hochreiter et al. | |
| 3,195,341 A | 7/1965 | Zunich | |
| 4,615,205 A | 10/1986 | Ragland, Jr. | |
| 4,719,787 A | 1/1988 | Ragland, Jr. | |
| 5,119,309 A | 6/1992 | Cavendish et al. | |

(Continued)

FOREIGN PATENT DOCUMENTS

| | | |
|---|---|---|
| EP | 0 395 224 A2 | 10/1990 |
| JP | 08-006986 | 1/1996 |
| JP | 08-287133 | 11/1996 |

OTHER PUBLICATIONS

Opposition filed against EP 1 290 515 on Jul. 17, 2009 on behalf of DYNAmore Gesellschaft fur FEM Ingenieurdienstleistungen mbH and Engineering Technology Associates, Inc.

(Continued)

*Primary Examiner* — Darrin Dunn
(74) *Attorney, Agent, or Firm* — Pauley Petersen & Erickson (57) ABSTRACT

The invention concerns a method for the creation of addendums (4) of tools for sheet metal formed parts (2). In the case of this method, fill surfaces (7) for the smoothing of irregular zones of a component edge (3) are generated. Initial directions (31) of sectional profiles (10) are determined in such a manner, that sectional profiles (10) at a distance from one another are arranged along a component (3, 8) with utilization of these initial directions (31) and that an addendum (4) is creatable by the connection of these sectional profiles (10).

12 Claims, 12 Drawing Sheets

(56) References Cited

U.S. PATENT DOCUMENTS

| | | | |
|---|---|---|---|
| 5,128,877 | A | 7/1992 | Tang |
| 5,379,227 | A | 1/1995 | Tang et al. |
| 5,463,558 | A | 10/1995 | Tang et al. |
| 5,731,816 | A * | 3/1998 | Stewart et al. ............ 345/419 |
| 5,793,373 | A * | 8/1998 | Sekine et al. ............ 345/420 |
| 5,974,847 | A | 11/1999 | Saunders et al. |
| 6,353,768 | B1 | 3/2002 | Karafillis et al. |
| 7,623,939 | B2 | 11/2009 | Hillmann et al. |
| 7,894,929 | B2 | 2/2011 | Hillmann et al. |
| 8,155,777 | B2 | 4/2012 | Hillmann et al. |
| 2002/0048494 | A1 | 4/2002 | Haberstock |
| 2002/0095236 | A1 | 7/2002 | Dundorf |
| 2003/0167097 | A1 | 9/2003 | Hillmann et al. |

OTHER PUBLICATIONS

Arthur Tang Affidavit dated Mar. 27, 2009.

Chin-Chun Chen Affidavit, dated Mar. 29, 2009, 1 page.

Arthur Tang Affidavit, dated May 27, 2009, 2 pages.

Wang, et al., Modeling of Forming Processes for Tool Design and Manufacturing at Volvo: Veijo Kokkonen, in: Computer modeling of sheet metal forming process; theory, verification and application, Proceedings of a symposium, Metallurgical Society and the TMS Detroit Section, 12th Automotive Materials Symposium, Ann Arbor, MI, Apr. 1985, pp. 13-20.

Jon Woughter Notarial Certificate, dated May 19, 2009.

Su Min Notarial Certificate and Affidavit on how the original Chinese document was retrieved, dated Apr. 28, 2009.

Hillmann, et al., "Finding the Best Way to Form Automotive Sheet Metal Parts—Using Parametric Die Face Design and Optimization," Int'l Body Eng. Confr. Detroit, Michigan, Oct. 3-5, 2000.

Opposition filed against EP 1 290 515 on Jul. 28, 2009 on behalf of Bayerische Motoren Werke Aktiengesellschaft (BMW).

U.S. Patent and Trademark Office, Examiner's anwer in response to the appeal brief filed Mar. 1, 2007 for Hillmann et al., U.S. Appl. No. 10/275,633.

Lu, S.C. et al., "Integration of CAD and FEA for Concurrent Engineering Design and Sheet Stamping," Transactions of the American society of Mechanical Engineers, Series B: Journal of Engineering for Industry, ASME, New York, US, vol. 118, No. 3, Aug. 1, 1996; pp. 310-317.

M. Pietsch, "Karosserieteile virtuell herstellen—Prozesssimulation fur die Autoindustrie," 3. Praxiskonferenz "Die Virtuelle Prozesskette Karosserie," Bad Nauheim, Oct. 30-31, 2000, 9 pages.

S. Harthun, "Geometry's Development of Cuppling Tools for Large Outer Skin Panesl," Dissertation, Published in 1999, ISBN 3-88355-289-5, Germany, 168 pages.

IBM, "CATIA-Workshop—Construction of CAD-drawing equipment," Training material, published in Sep. 1997, 191 pages.

Jorg Danzerg, "HydroMech," Interim report for the reserch project, published in Nov. 1998, 29 pages.

W. Wohnig et al., "Computerized construction of tools for sheet metal forming," in Neuere Entwicklungen in der Blechumformung (Newer developments in the sheet metal forming), technical paper, 1994, pp. 415-422.

W. Yuguo et al., "Addendum and Binder Surface Desing for Automotive Panel Drawing Die," J. of Shanghai, Feb. 1999, vol. 33, No. 2 (10 pages) with Abstract.

GM Die Face Engineering Training Notes, Apr. 10, 1991, (54 pages).

B.K. Choi et al., "Sweep surfaces modelling via coordinate transformations and blending," butterworth & Co. (Publishers) Ltd., © Mar. 2, 1990, vol. 22, No. 2, pp. 87-96.

J.Y. Zheng, "Acquiring 3-D Models from Sequences of Countours," IEEE Transactions on Pattern Analysis and Machine Intelligence, Feb. 1994, vol. 16, No. 2, pp.163-178.

J. Ferguson, "Multivariable Curve Interpolation," J. of the Assoc for Computing Machinery, Apr. 1964, vol. 11, No. 2, pp. 221-228.

* cited by examiner

METHOD FOR THE DESIGNING OF TOOLS

CROSS REFERENCE TO RELATED APPLICATION

This application is a continuation of U.S. patent application Ser. No. 13/032,098, filed 22 Feb. 2011, now U.S. Pat. No. 7,623,939 issuing 10 Apr. 2012, which is a continuation application of U.S. Ser. No. 10/275,633, filed 21 Apr. 2003, now U.S. Pat. No. 7,894,929, issued on 22 Feb. 2011. These related patent applications are hereby incorporated by reference herein and is made a part hereof, including but not limited to those portions which specifically appear hereinafter.

BACKGROUND OF THE INVENTION

1. Field of the Invention

The invention presented here lies in the field of the designing of addendum zones of tools for the manufacture of formed sheet metal parts (deep-drawing/stretch-forming processes) and their optimization.

2. Discussion of Related Art

Formed sheet metal parts as a rule are manufactured by deep-drawing. The semi-finished parts, the so-called sheet metal blanks (blank), for this purpose are placed in multi-part forming tools. By means of presses, in which the forming tools are clamped, the parts are formed. The parts, as a rule, are manufactured out of a flat sheet metal blank in several forming steps (drawing, reshaping, setting, etc.), combined with trimming steps. In this process the edge areas, in particular the addendums, represent problematic zones. In the designing of the tools for a forming step the concern is, among others, to complement the correspondingly prepared component geometry. In the case of multi-step processes, intermediate geometry (component geometry and intermediate geometry both being hereinafter referred to as component geometry) in the edge zones is modified by an addendum such that, from it, a tool geometry is produced with which the predefined component geometry can be manufactured such that no failure occurs (cracks and wrinkles) and that other quality requirements, for example, a limited reduction of the thickness, the achievement of a minimum stretching of the sheet metal, and manufacturing technology restrictions are adhered to.

The dimensioning and adjustment of the addendums represents a great problem field today. Not infrequently several months elapse, until a tool works satisfactorily. Frequently, this is an iterative process, which is associated with a lot of rejected parts and a substantial consumption of energy and other utilities. The production of addendums today, to a great extent, takes place manually by means of computer-aided design systems (CAD) and takes a lot of time. In doing so, frequently hundreds of individual surfaces are created and edited by the designing of curves, supporting surfaces derived from them, and their trimming. Already solely the establishment of an addendum for a large body part can, as a result, easily take several weeks. This procedure also calls for a great specialist knowledge in the fields of forming technology and CAD of the designer.

In the recent past, procedures have been developed and implemented, which make possible the creation of addendums in a more efficient manner. These are based on an addendum being described by means of flat sectional profiles. The known sectional profiles are different to link, resulting in bad interpolation data for addendum surfaces. For most tools, in addition, a limited number of such sectional profile types are sufficient. If one applies sufficient flat sectional profiles radially outwards from the component edge, then from it, by an interpolation transverse to the sectional profiles, the addendum surface can be more or less automatically created. In doing so, the indication of a few sectional profiles is sufficient to be able to then interpolate the sectional profiles from it. This method is not convincing. By a variation of the sectional profiles the addendum can be varied. With this procedure, the user, as compared to previous iterative methods, can save time in the development and modification of the addendum. The resulting addendum surfaces are still problematic due to insufficient results from interpolation. These procedures are stand alone solutions not linked with other devices, e.g. simulation modules.

This procedure, however, has the following serious disadvantages and problems. On the one hand, the smoothing of the edge of the component represents a major problem. The edge of the component geometry, where the addendum is to be applied, is in most instances not a smooth curve, but rather more frequently has sharp-angled indentations, tongues, etc. If now the same sectional profile throughout is applied to this edge, then these indentations, etc. continue into the addendum, which can lead to an extremely irregular addendum surface. In order to prevent this, the user once again is compelled to manually introduce many sectional profiles at the indentations and to adapt them such that they lead to a fairly smooth addendum surface. Alternatively, it is attempted to first fill up and to equalize the indentations, tongues, etc., with the help of traditional CAD functionality, so that a new, sufficiently large smooth component edge is produced, from which then the sectional profiles are applied. Both solutions require a lot of time and lead to the result that no usable addendum can be produced fully automatically. The latter fact is a disadvantage, particularly if one would like to automatically design, resp., optimize the addendum via an optimization loop in conjunction with a forming simulation code and a quality criterion. On the other hand, the sectional profile direction is difficult to determine automatically. The directions in which the sectional profiles are applied away from the component edge (resp., from the filled out component edge), decisively determine the generated addendum surfaces. In applying the directions vertical to the edge of the component projected in the drawing direction, at concave points overlaps of the sectional profiles result, which makes the creation of the addendum surface impossible.

SUMMARY OF THE INVENTION

It is an objective of the present invention to demonstrate a method how addendum surfaces for forming tools can be optimized and created efficiently and easily while avoiding the disadvantages known from prior art.

The invention divulged here is embedded in the process of tool designing (methods planning). The invention makes possible a significant reduction of the manufacturing effort, in that a new computer-based methodology is applied. Apart from the possibility of creating and varying an addendum significantly more rapidly, in doing so it is also possible to create a best possible tool via an optimization loop in conjunction with a forming simulation code. The procedure described in the present invention for the establishment of a parameterized geometry and process model, starting out from the component geometry, can be summarized in a simplified manner with the following steps. First, prepare the component geometry; second, determine the direction of drawing; third, create surface for the smoothing of irregular zones of the edge of the component; fourth, generate binder surface;

fifth, determine sectional profile directions; sixth, definition of sectional profiles at defined points; seventh, interpolation of intermediate profiles using forming technology parameters for the creation of the addendum surfaces; eighth, interactively adapt the characteristic lines, resp., automatically smooth them and correspondingly adapt addendum surfaces; ninth, creation of the punch opening line as intersections of the sectional profiles with a binder surface and the smoothing, resp., modification of it. When taking over the tool model into the simulation, the following steps for the definition of the process models follow: Extraction of the individual tool components from the generated geometries; specification of the blank outline or, in the case of inverse simulation procedures, of the outline of the drawn-in sheet metal; specification of the material, of the sheet metal thickness and of the direction of rolling; specification of the lubrication conditions; definition of the retaining devices (for example, draw bead, spacer, binder force); determination of the tool movements and of possible relieving steps during the forming. Iterative procedure between several of the above mentioned steps having an alternative sequence is likely if necessary. And single steps may also be omitted.

A tool for the forming of a blank in one stage as a rule consists of three parts: A die, a binder, and a punch. By means of the binder, which usually has a curved shape, the blank is pre-formed and fixed in an edge zone of the die. The actual deep drawing takes place, in that the blank is pressed into the die by means of the punch. The edge zones are usually designated as complementary surfaces. These then are divided into binder surfaces located outside the punch zone and the addendum located inside the punch. These zones are decisive to fulfil the quality requirements. The addendum as a rule runs into the component and the binder with a continuous tangent and is located within the action zone of the die and of the punch. In the case of components with large cut-outs, such as the side wall frames of passenger vehicles, in addition to the external addendum several additional internal addendums can be present.

The invention presented here concerns a method, which makes it possible, starting out from the geometry of a component, to as rapidly as possible establish a parameterized addendum and, if so required, a parameterized geometry and process model for a forming simulation based thereon. The objective is, as early as possible during development, possibly already during the design of the component, to make statements about the forming and manufacturing feasibility of a component with the help of forming simulations and taking into account addendums. With this, it is possible to make required corrections to the geometry of the component at an early point in time. By means of a suitable parameterization it is possible that the tool geometry (as well as the addendum) and the process can be varied by means of few, scalar parameters. For a rapid assessment of different variants or also with a view to the automatic creation of an optimal addendum, if so required an optimization loop and/or a forming simulation code and/or a quality criterion are utilized in combination.

For the following description of the invention the assumption is departed from, that the forming tools move in a global z-coordinate direction. This direction is designated as vertical; directions vertical to this axis (x, y-directions) are designated as horizontal. For purposes of simplification, it is assumed that a component is free of undercuts, i.e., the projection in z-direction onto a horizontal plane shall be a one-to-one correspondence, with the exception of component surfaces in an exactly vertical direction.

The present invention also pertains to smoothing irregular zones of the component edges automatically or manually, in preference towards the outside, i.e., away from the problem zones, and to automatically fill up the space produced with optimized fill surfaces. These smoothed edges of the component are hereinafter referred to as base lines. They can either be manually predefined or, for example, generated by geometrical smoothing algorithms, for example, by the virtual "unrolling" of a cylinder with a vertical axis along the edge of the component; this defines the x- and y-coordinate of the base line; the z-coordinate is advantageously generated by the creation of the fill surfaces. Fill surfaces making sense preferably run into the component geometry with a continuous tangent. Such surfaces are, for example, generated by means of geometrical approximations taking into consideration the C1 edge condition (at the component edge), or, for example, by means of a finite elements shell solution with corresponding edge condition at the edge of the component (in this context refer to FIG. 2).

The horizontal directions of the sectional profiles as a rule determine how a geometrical detail of the component (feature), which extends to the edge of the component, affects the addendum. It is, therefore, advantageous that geometrical details in the component geometry and their branches in the addendum essentially have the same direction. This presupposes, that a certain direction of the sectional profiles is a prerequisite (in this context refer to FIGS. 10, 11, 12).

Figure 5:
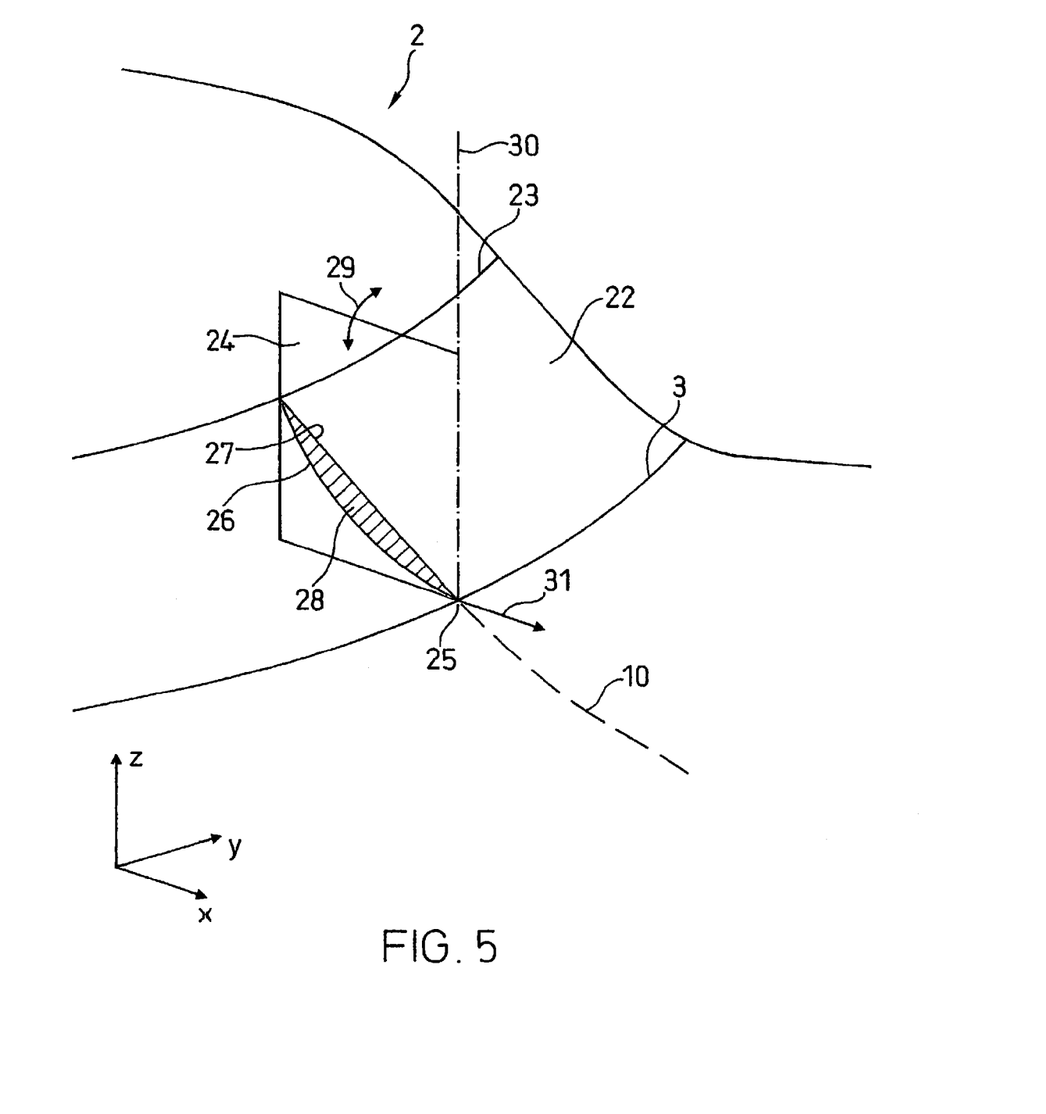
FIG. 5 shows a design method of initial directions.

In the present invention, the initial directions of the sectional profiles on the edge of a component are preferably determined such that they point in the direction of the minimum geometrical change in a defined, fictitious edge zone of the component or in correlation with the flow-direction of the material. Alternative arrangements, such as in concave areas, are possible to avoid negative overlapping. The fictitious edge zone of the component is here notionally formed by a fictitious strip along the edge of the component (resp., the base line), lying in the inside of the component. This edge zone as a rule has a width, which is, for example, approximately 10-times the thickness of the sheet metal. How the direction of the minimum geometry change can be determined is illustrated in FIG. 5. If necessary, adjustments of the initial directions are possible to avoid disadvantageous overlapping of sectional profiles in concave areas.

In order to avoid the problem field associated with prior art of an overlapping of sectional profiles, in particular in the zone of concave edge points of a component, the invention makes use of defined sectional profiles. These as a rule do not run in a plane, but in a curved surface. Alternative arrangements are possible as long as no intersection is occurring. Preferred examples of such surfaces are cylindrical or parabolic surfaces with a vertical alignment. The sectional curves of these profiles with a horizontal plane are therefore curved or straight curves. These curves serve as horizontal directrixes for the sectional profile. The course of the directrixes is determined by means of geometrical algorithms (polynomial approaches). Alternatively, it is also possible to proceed as follows: Departing from the edge of the component, the curves are applied as flectional beams, which are fixed to the edge of the component in the direction of a minimum geometry change and are connected transverse to one another with an elastic continuum or with springs. A corresponding model, for example, is brought to the static equilibrium with the finite elements method (FEM). (In this context refer to FIG. 4).

According to prior art, up until now the vertical course of the sectional profiles was predefined either through spline curves (for example, B-splines or Bézier curves) or through geometrical basic elements such as line segments, curves, etc, which are put together in a tangent-continuous course. While the first makes possible an easy changing of a sectional profile, it has, however, the disadvantage that accurate dimensions or the accurate geometry of a part of a curve, for example, a draw bar height or a draw bar radius, it is very difficult to accurately predefine. In the case of the second type of specification, while accurate dimensions can be determined, changes, however, are laborious, because the tangent condition between the basic elements always has to be adhered to. In order to create addendum surfaces, in addition the not-predefined sectional profiles (intermediate profiles) had to be generated from the closest predefined sectional profiles. If these predefined sectional profiles deviated strongly from one another, an automatic interpolation in general led to insufficiently flat surfaces, resp., to unexpected and undesirable intermediate forms. For example, a large circular arc predefined within a sectional profile would not necessarily be continuously transformed into a smaller predefined circular arc in the next sectional profile through circular arcs with reducing radii, but, depending on the interpolation, through non-circular intermediate forms. This problem was partially overcome, if the user accepted, that between the differing sectional profile types manual transition elements (junctions) have to be defined.

The problem field described above is solved preferably as follows in the case of the invention divulged here: The sectional profiles are preferably described by a single type of geometry, (see FIG. 9), which has to be sufficiently general in nature to be able to describe the common sectional profile forms. Sectional profiles arranged next to each other are of corresponding nature making sure that no interpolation errors occur. These sectional profiles are parameterized by forming technology scalar values easy to comprehend by the user (hereinafter referred to as profile parameters), such as, for example, component run-off length, flange length, flange angle, draw bar height, draw bar width, draw bar radius, step height, wall angle, die radius, etc. The sectional profile is then built up based on these profile parameters out of basic elements, for example, circular arcs and line segments, in an automated manner (in this context refer to FIG. 9). In the case of inconsistent profile parameters, these are automatically adapted and optimized in accordance with a defined priority. In this manner, a sectional profile can be predefined exceedingly easily and clearly.

The courses of the intermediate profiles lying between the defined sectional profiles, in contrast to prior art, are, as a rule, not directly interpolated. Rather, first the profile parameters for every intermediate profile relevant to forming technology are established. From these (interpolated) values then the course of the intermediate profiles is built up. This, in the case of the example mentioned above, leads to the consequence that the predefined large circular arc is transformed into the predefined small circular arc through exact circular arcs with reducing radii, if the corresponding radius is such a profile parameter.

In the case of the methods for the creation of addendums known from prior art, height differences and tangent jumps along the edge of the component have an effect up to the punch opening line. This in general is undesirable. With the methods known from prior art it is, therefore, necessary to correct these jumps manually by means of laborious and time-intensive adaptation of the sectional profiles. Here too, automation is practically impossible.

In the case of the invention divulged here, this problem is solved as follows. Sectional profiles possess characteristic points, which describe the principal course of the sectional profile, Mentioned as examples for such characteristic points shall be a summit of a draw bar, the flank of a step or the control points of a spline, of a Bézier- or of a NURBS curve. Those characteristic points of every sectional profile corresponding to one another can now be joined together and with this form (continuous) characteristic lines, which extend along an addendum (parallel to a component edge) or at least over sections of it, e.g., the summit line of a draw bar (refer to FIG. 7). The lines defined in this manner are especially suitable for changing the addendum interactively, in that they, for example, are approximated as splines easily variable through control points. Both changes in a vertical direction (i.e., for example, the course of the height of a draw bar) as well as changes in horizontal direction (i.e., for example the horizontal position of the draw bar) can be implemented with this. The change specifically influences the corresponding parameters of the sectional profiles lying in the area of the change and correspondingly the addendum surface. Since a change of a characteristic line in a controlled manner influences several adjacent sectional profiles, such a change is significantly easier to implement than by means of the (manual) changing of individual sectional profiles. If the changing of a profile parameter is to lead to changes of other profile parameters in the adjacent sections (e.g., the changing of the draw bar height shall simultaneously cause a change of the width of the draw bar), then a corresponding working connection can be defined by a coupling matrix. In the case of the method described here, it is also possible to automatically smooth the characteristic lines. With this, geometry jumps at the edge of the component can be easily smoothed. As smoothing algorithms, for example, one can again utilize uncoiling algorithms, and this both in the horizontal plane as well as in the height.

The concept of the characteristic lines can also be transferred to profile parameters, which cannot be represented as a spatial line on the addendum, e.g., the run-in radius or a draw bar radius. Such profile parameters are advantageously represented as characteristic lines in an x-y diagram, whereby on the abscissa the path around the addendum and on the ordinate the profile parameter is applied. The resulting curve can, for example, once again be approximated as a spline easily variable through control points. Interactive or automatic changes (e.g., smoothing) are transformed into a change of the addendum surface in analogy to the procedure described in the preceding paragraph. This procedure, of course, is also alternatively applicable to the profile parameters that can be represented as a spatial line.

If the generated tool geometry is to be checked by means of a forming simulation, or if it is to be automatically optimized in an optimization loop together with a forming simulation code and a quality criterion, then now still lacking is the tying into the forming simulation. For the forming simulation, as a rule three methods are utilized.

Single-step/multi-step simulations based on the component geometry. These are usually carried out in accordance with an inverse process, whereby the component geometry is departed from, it is squashed flat and the resulting elongations in the flat sheet metal are, in principle, depicted inverted on the component. As a result of the neglecting of the important influence of the addendum and of the binder, such simulations represent a rough estimate. Here they are irrelevant, because the concern here is the assessment of a tool design.

Single-step/multi-step simulations based on the tool geometry: Usually carried out in accordance with the same method, here the geometry of the addendum and of the binder as well as the retaining devices (e.g., draw beads, binder force) are taken into consideration in the binder. Required as geometry here is that of the complete tool, therefore, in principle the die.

The resulting accuracy enables the assessment of a tool design, however, no direct statements about the behaviour of the sheet metal during the forming can be made. An important result of an inverse single step simulation is the required outline of the blank, which is required in order to achieve the outline of the predefined geometry at the end of the drawing process. Single-step/multi-step simulations can also be carried out as forwards method, i.e., departing from the blank.

Incremental simulations based on the tool geometry: Here, departing from the flat blank the forming is simulated in time steps (incrementally). The essential geometrical and process-conditioned influencing values can be jointly taken into consideration accurately. A geometrical description of all participating tools is required, therefore, for the simplest forming process a die, a punch, and a binder. This method is the most accurate simulation method, calls for, however, significantly more calculation time than a single step process. Available as the result apart from the end condition are also the intermediate conditions.

For the checking of a tool geometry, the two latter methods are possible. Current systems for the generation of tools are, however, not very closely linked to forming simulation systems, so that for the implementation of simulations in most instances a considerable effort through various interfaces and data conversions has to be undertaken.

The method described above for the creation of addendum zones, preferably is combinable with a system in which a parameterized simulation model (tool or process) is utilized for the optimization of a component. Optionally possible is both a single-step/multi-step, as well as an incremental simulation, possibly combined with an evaluation and/or an optimization module. This system is characterized as follows:

Parametric creation of the part tools: From the complete tool surfaces (component+addendum+binder ring), the utilized tools, e.g., the die (complete tool surfaces), the punch (tool surfaces without binder ring and without die radius), and the binder (binder surface cut-out along the punch opening line) can be created. An offsetting of the tools, if so required, is automatically carried out. For the creation of the punch, if so required, in the wall zone automatically modified sectional profiles are utilized (e.g., with a steeper wall angle), in order to produce the necessary drawing gap. Simultaneously, also the process history required for the simulation, i.e., the travel paths of the tools, can be generated automatically. A changing of the addendum therefore automatically entails the corresponding change of the part tools and of their travel paths.

Parametric creation of the course of the draw beads: Draw beads (beads attached in the binder zone for controlling the sheet metal draw-in) are automatically generated on the binder surface at a predefined constant or variable distance from the punch opening line or from another characteristic line of the addendum. A change of this line then automatically entails a change of the draw beads.

Parametric creation of the drawn-in sheet metal outline at the end of the forming for the inverse simulation: For the inverse simulation, in the case of which one predefines the geometry at the end of the forming process, the drawn-in outline of the sheet metal is also generated automatically on the binder surface at a predefined constant or variable distance from the punch opening line or from another characteristic line of the addendum. A changing of this line then automatically entails a change of the drawn-in sheet metal outline.

Parametric creation of the blank outline: The blank outline can be generated in analogy to the draw bead courses described above. An additional variant is described in the following: For an as minimal as possible consumption of material, the blank should be selected as small as possible. However, the sheet metal outline during the forming in general should not run into the addendum over the punch opening line, i.e., at the end of the drawing process a small flange should remain in the binder zone. For this reason, the following procedure is chosen here: First, the drawn-in sheet metal outline for an inverse single-step simulation is created as described above. Thereupon the inverse single-step simulation is carried out. The result of this simulation is the required blank outline, which is necessary, in order to obtain the predefined drawn-in sheet metal outline. This procedure is carried out at the beginning of an incremental simulation, in order to find a favourable blank outline for the currently investigated geometry alternative. This procedure makes sense, because the inverse single-step simulation requires significantly less calculation time than an incremental simulation. The procedure can be transferred in analogy to the internal boundaries in case of perforated blanks. In order to save the tool costs for the trimming tool of the blank, usually a simple, polygonal line blank is preferred, e.g., a rectangular one. If so required, the blank outline obtained from the inverse single-step simulation is bordered with a rectangle of minimum length and width, whereby the orientation of the rectangle in the horizontal plane is changed until a rectangle of minimum surface area has been found. Instead of the blank outline obtained from the single-step simulation, this rectangle is now utilized as blank outline for the incremental simulation. For other simple polygonal outlines, the procedure is analogue.

Therefore, every parametric change of the tool surfaces automatically results in a changing of the part tools derived from it, of their travel paths, of the draw bead course, of the blank outline, etc., so that the simulation can be restarted again without any manual intervention. As compared to the prior art, the effort for the preparation of alternative simulations, whether manual or carried out automatically within an optimization loop, can be significantly reduced: When changing the parameters of the tool geometry, immediately and fully automatically a new tool geometry and an appertaining consistent geometry and process model for the simulation are created.

If desired, it is possible to use the geometrical information and data related to the tool (die, binder, punch) and the sheet metal part, handled and generated by the herein described invention, as input data for tooling. In this way it is possible to avoid additional processing by a CAD-System, which results in a further optimized process.

BRIEF DESCRIPTION OF THE DRAWINGS

These and further features of the invention will be apparent with reference to the following description and drawings, wherein.

DESCRIPTION OF PREFERRED EMBODIMENTS

Figure 1:
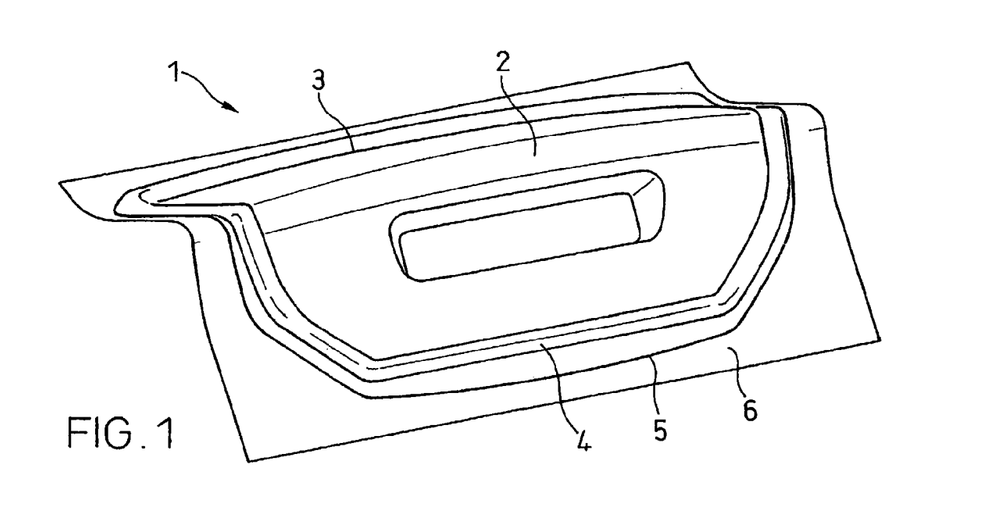
FIG. 1 shows the essential zones of a forming tool.

FIG. 1 illustrates essential elements of a forming tool 1. Identifiable are a component 2, a component edge 3, an addendum 4, a punch opening line 5 and a binder surface 6.

Figure 2:
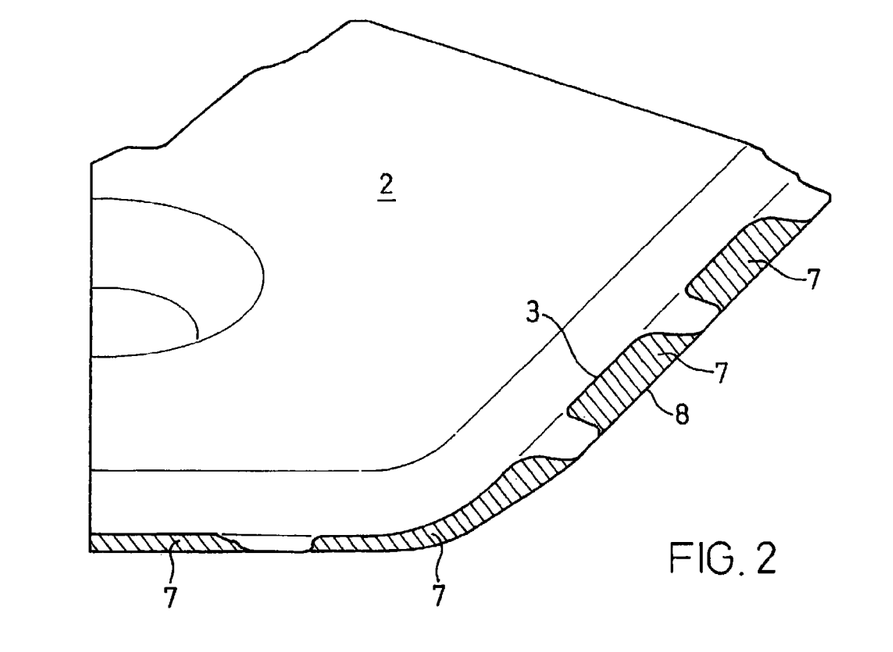
FIG. 2 illustrates a component.

FIG. 2 shows a component 2 with an irregular component edge 3. The irregularities in the course of the edge of the component 3 are filled in with fill surfaces 7 and smoothed. Fill surfaces have to merge C1-continuous (values of the first differentiation identical on both sides) into the geometry of the component 2. Such surfaces 7 can, for example, be generated through geometrical approximations under C1-boundary condition on the edge of the component 3, or through a finite element shell solution with C1-boundary condition. The fill surfaces 7 resulting in this manner are smoothed and continuous and complement the component 2 in an optimum manner. In the zone of a fill surface 7, alternatively an edge 8 of the fill surface 7 is decisive for the course of the sectional profiles.

Figure 3:
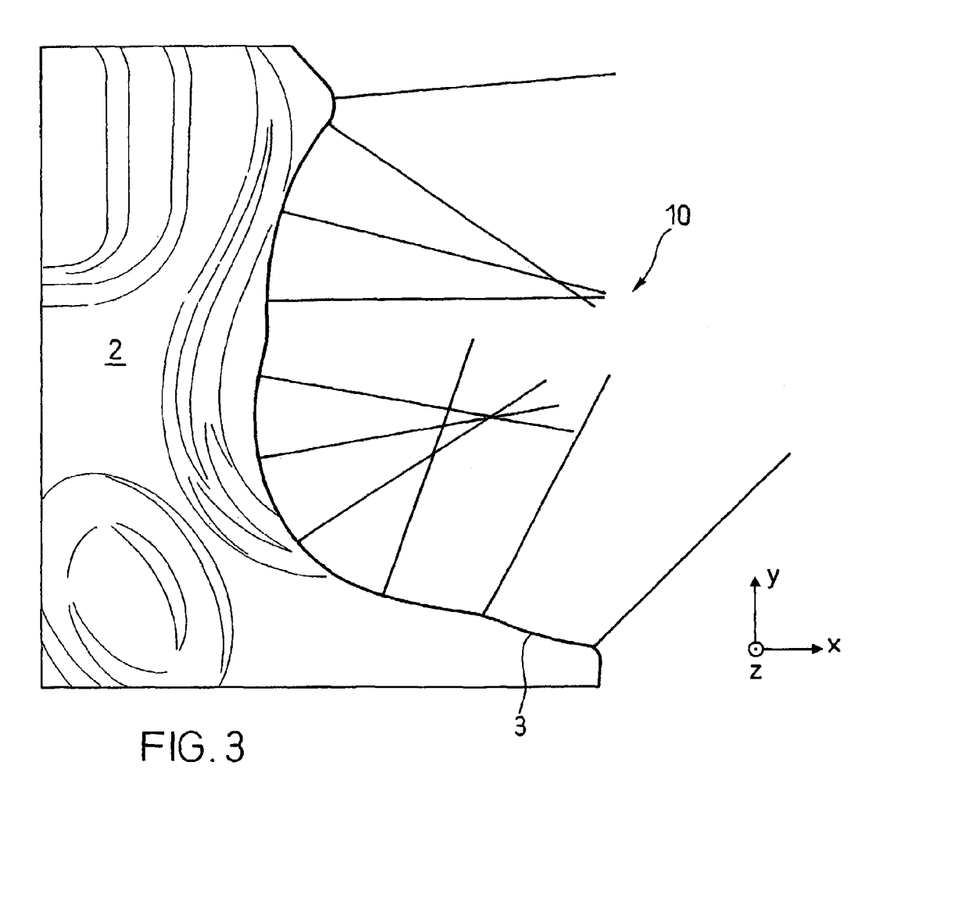
FIG. 3 shows a course of straight sectional profiles.

FIG. 3 illustrates the situation, as it is known through prior art. To be seen is a plan view (in direction of the z-axis) of a section of a component 2 with a component edge 3 with a concave course. Straight sectional profiles 10, as they are known through prior art, are arranged vertically to the edge of the component 3. On the basis of this arrangement, they manifest overlaps.

Figure 4:
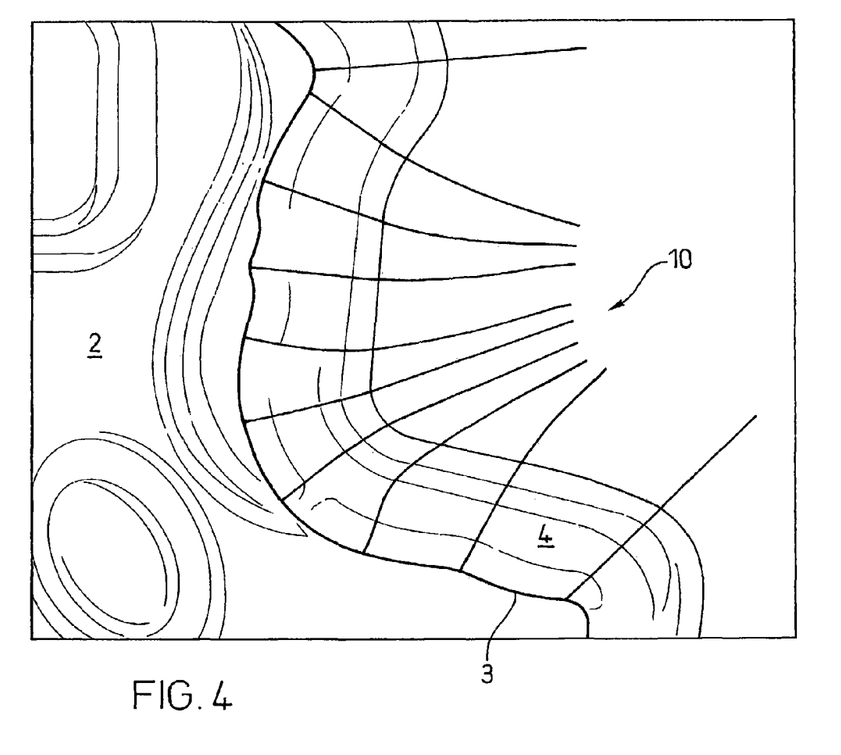
FIG. 4 illustrates a course of curved sectional profiles.

FIG. 4 shows a section from the component 2 in accordance with FIG. 3. Identifiable are an addendum 4 and sectional profiles 10. The sectional profiles here have been created by means of the method in accordance with the invention. To be identified is the fact, that in the plan view they do not have a straight course, but are curved. In particular, they here do not manifest any overlaps. Preferably, they are arranged such that they correspond to the natural course of geometrical details of the component. For example, they follow their extended course in the addendum. With this, the actual edge of the component plays a subordinate role.

FIG. 5 schematically illustrates how the horizontal initial direction of a sectional profile 10 is generated. This direction is particularly advantageously determined by means of the determination of the minimum geometry change. Identifiable are a component 2, a component edge 3 (resp., the edge of a fill surface), and a component edge boundary zone 22, which is edged by the edge of the component 3 and an inner limiting line 23. In order to determine the initial direction of a sectional profile in a point 25 on the edge of the component 3, resp., if so required on the edge of fill surfaces (not illustrated in more detail), a sectional curve 26 between a vertical (parallel to the z-axis) plane 24 also running through the point 25 is formed. The deviation of this sectional curve 26 from a straight line 27, represented by a hatched area 28, serves as a measure for the geometry change. The surface 24 is now varied so long by revolving around a vertical axis 30 (illustrated by an arrow 29) running through the point 25, until the geometry change fulfils a certain measure. As a rule, this is a minimum. The initial direction of a sectional profile in a horizontal plane (x/y-plane), which results from the plane 24, is schematically made clearer by an arrow 31. Another possibility consists of using the curvature in the edge zone of the component 22 as a measure. When using the curvature as a measure for the geometry change, the direction of the corresponding sectional profile is advantageously placed in the direction of the smaller principal direction of a curvature tensor projected into a horizontal plane.

Figure 6:
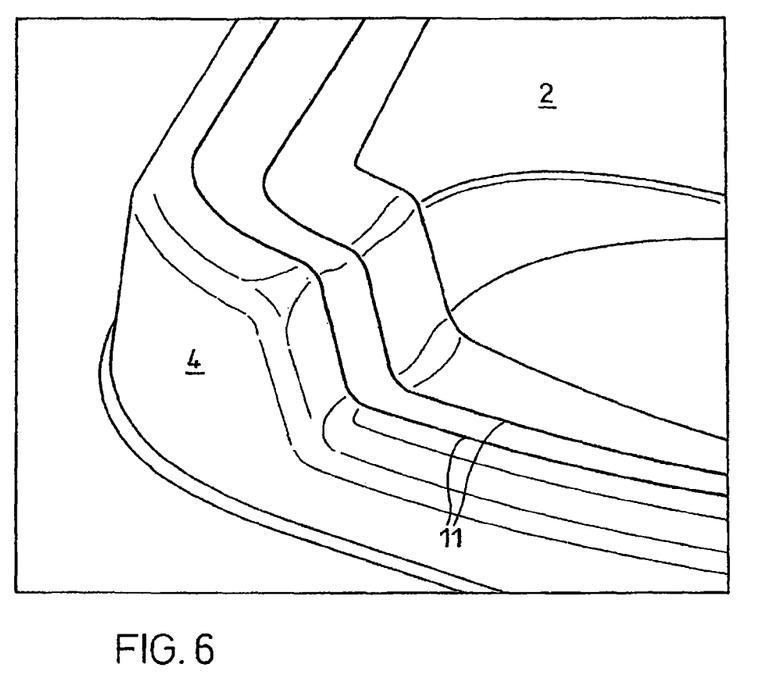
FIG. 6 shows a first addendum with a discontinuous course.

FIG. 6 shows the typical course of characteristic lines 11 in an addendum 4 of a shape for a component 2. The course of the characteristic lines 11 on the basis of great differences in height and tangential jumps is disadvantageously irregular.

Figure 7:
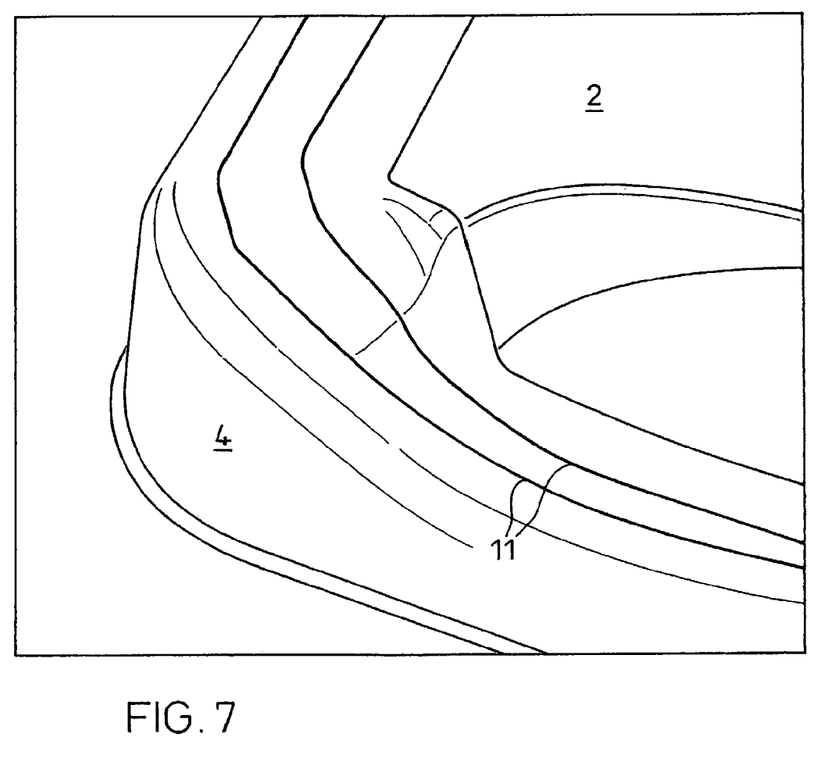
FIG. 7 illustrates a second addendum with a continuous course.

FIG. 7 illustrates a smoothed course of the characteristic lines 11 in accordance with FIG. 6. The addendum 4 of the shape for a component 2 as a result manifests a significantly more advantageous design. Therefore, in production much better results are achieved.

Figure 8:
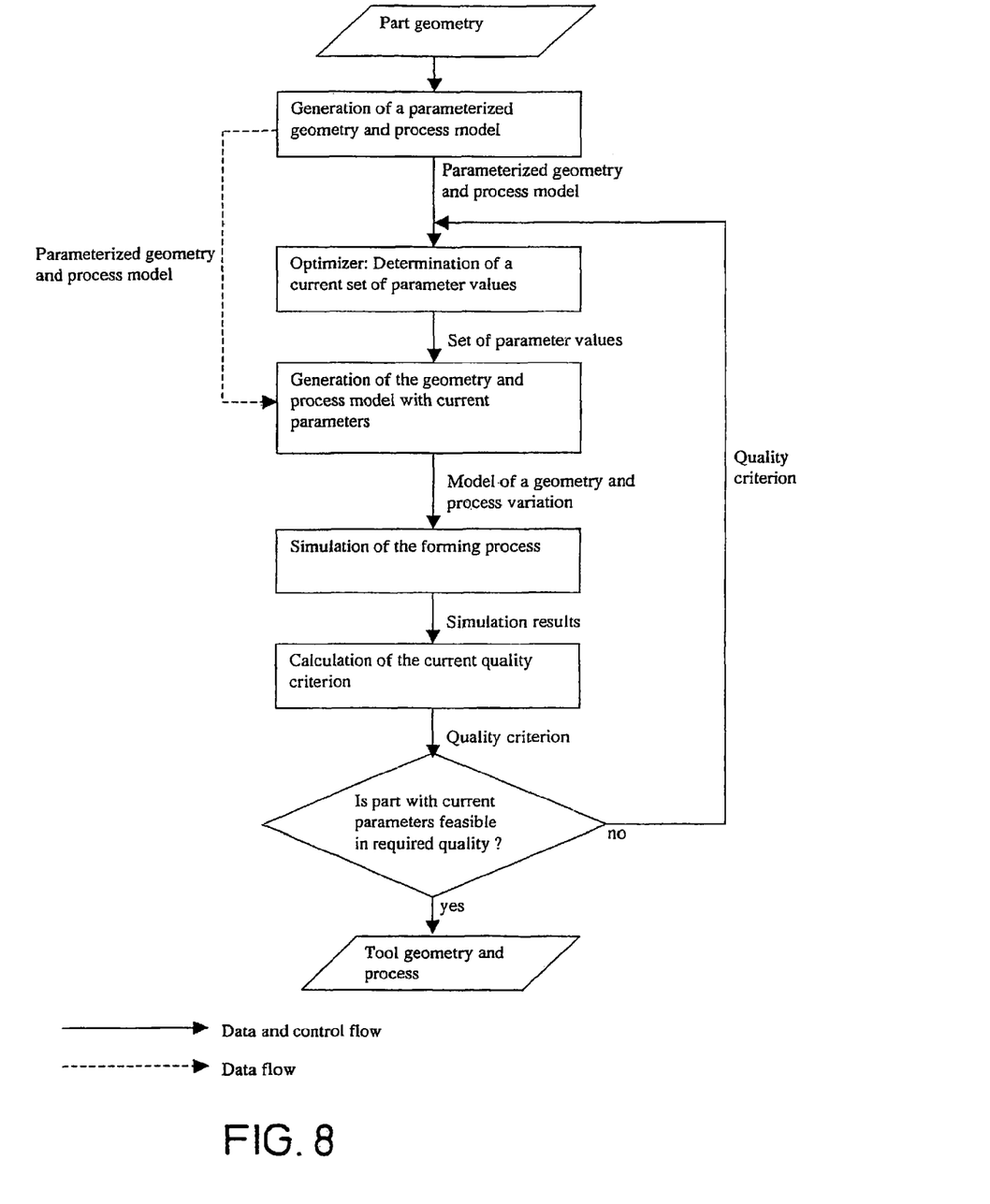
FIG. 8 shows a diagram with the essential optimization steps.

FIG. 8 schematically illustrates the essential steps, which are necessary for the automatic generation of addendums. The addendum is optimized by means of a so-called optimizer and a quality criterion.

Figure 9:
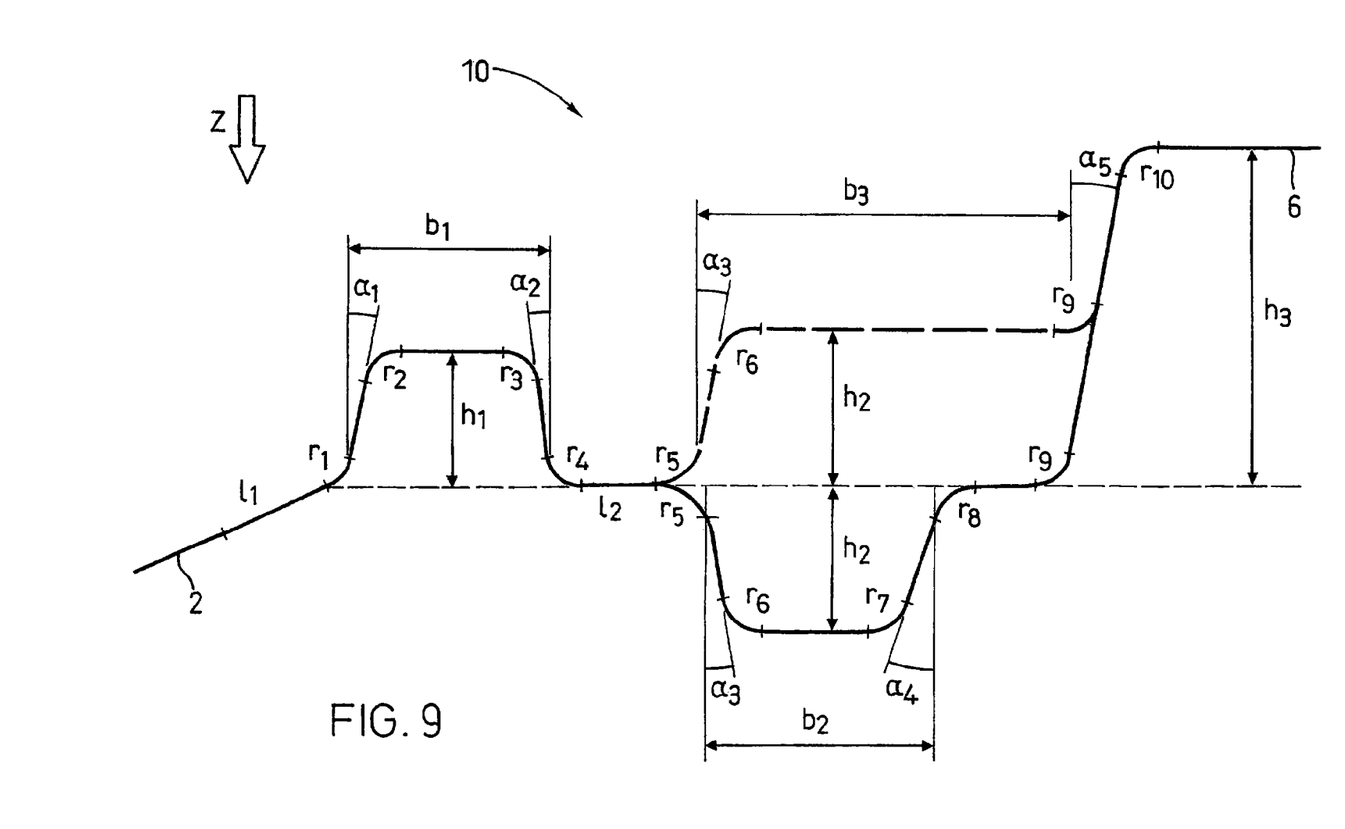
FIG. 9 shows a parameterized sectional profile.

FIG. 9 in a generalized manner shows a parameterized cross section of a sectional profile 10 as a representative for a single type of geometry. The sectional profile 10 is parameterized by means of forming technology scalar values (profile parameters), such as, for example, component run-off length, component run-off radius, flange length, flange angle, draw bar height, draw bar width, draw bar radius, step height, step radius, wall angle, die radius, etc. The sectional profile 10 based on these profile parameters is built up from basic elements, for example circular arcs, splines and line segments, preferably in an automated manner. One or more parametric values may be close to or zero if necessary. Corresponding points are connected to obtain addendum surfaces.

Figure 10:
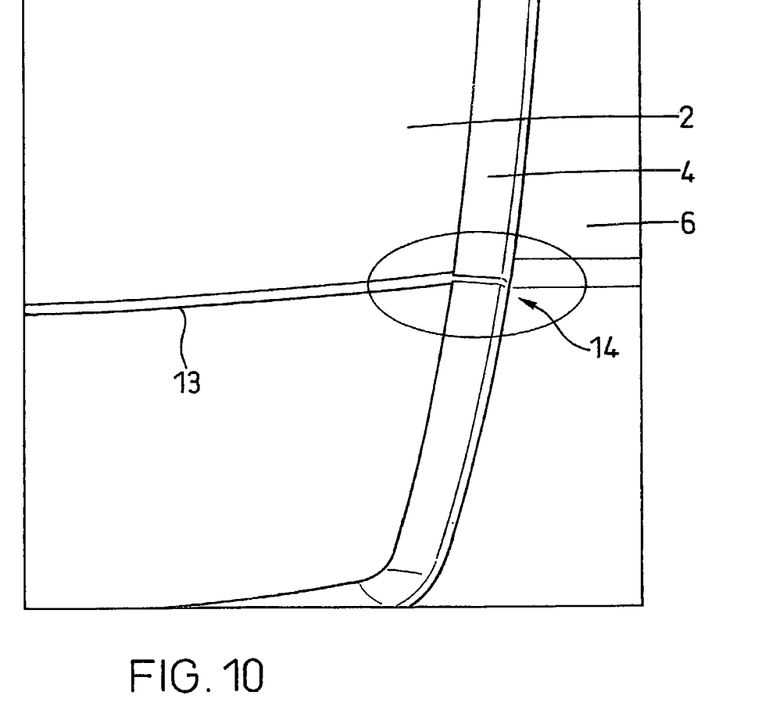
FIG. 10 illustrates a component with an addendum zone.

FIG. 10 illustrates a geometrical detail 13 and its effect on an addendum 4. The horizontal directions of the sectional profiles as a rule determine how the geometrical detail 13 of the component 2 (feature), which extends to the edge of the component, has an effect on the addendum 4. It is therefore advantageous that such geometrical details 13 in the component geometry and their branches 14 in the addendum 4 essentially have the same direction (which is not the case in this illustration).

Figure 11:
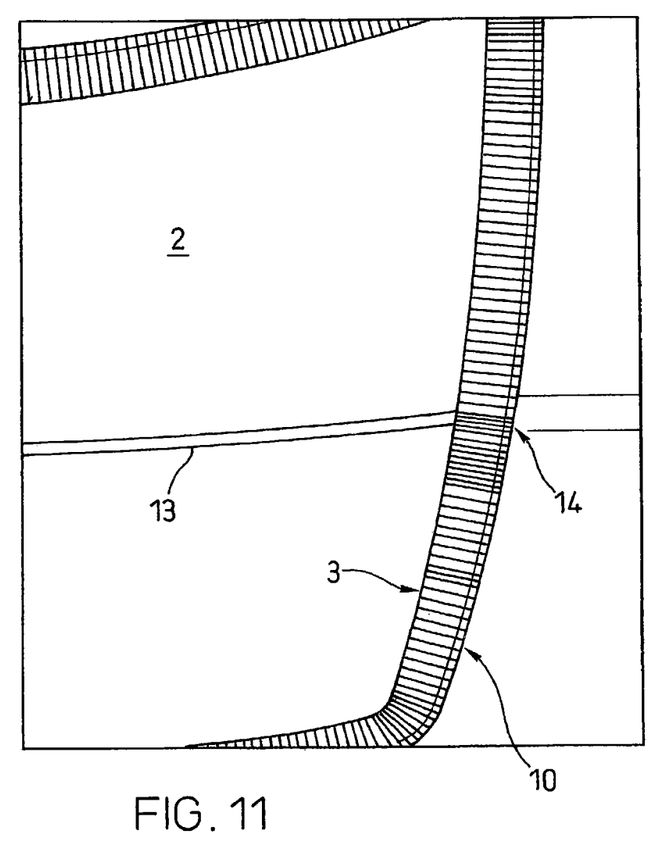
FIG. 11 shows the component in accordance with FIG. 10 with sectional profiles.

FIG. 11 shows the typical course of sectional profiles 10 which, in accordance with the procedures known from prior art, are arranged vertically to a component edge 3. As a result of this, the result shown in FIG. 10 is produced, in the case of which the branches 14 of a geometrical detail 13 continue in an unfavourable direction in the addendum 4.

Figure 12:
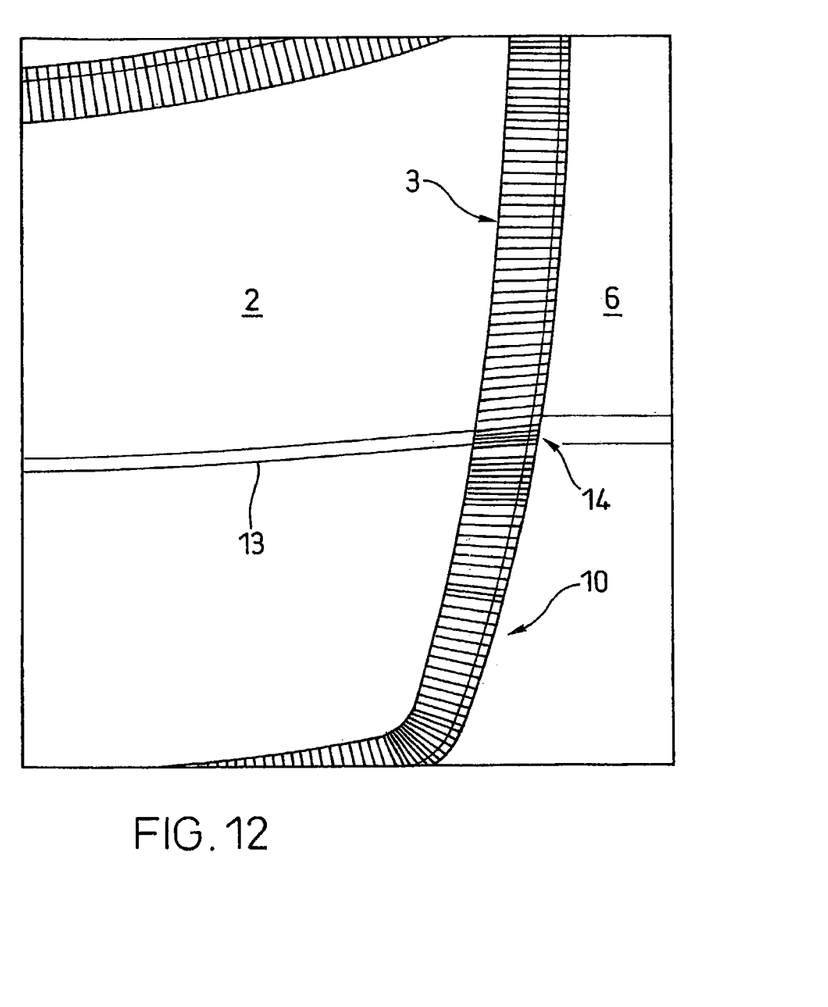
FIG. 12 illustrates a component with optimized sectional profiles.

FIG. 12 illustrates an arrangement of sectional profiles 10 along the edge of the component 3 in accordance with the invention. The sectional profiles are arranged such that the natural course of geometrical details 13 in the component 2 is taken into account. The direction of the branches 14 as a result of this essentially corresponds to the direction of the geometrical detail 13 in the zone of the edge of the component 3.

Figure 13:
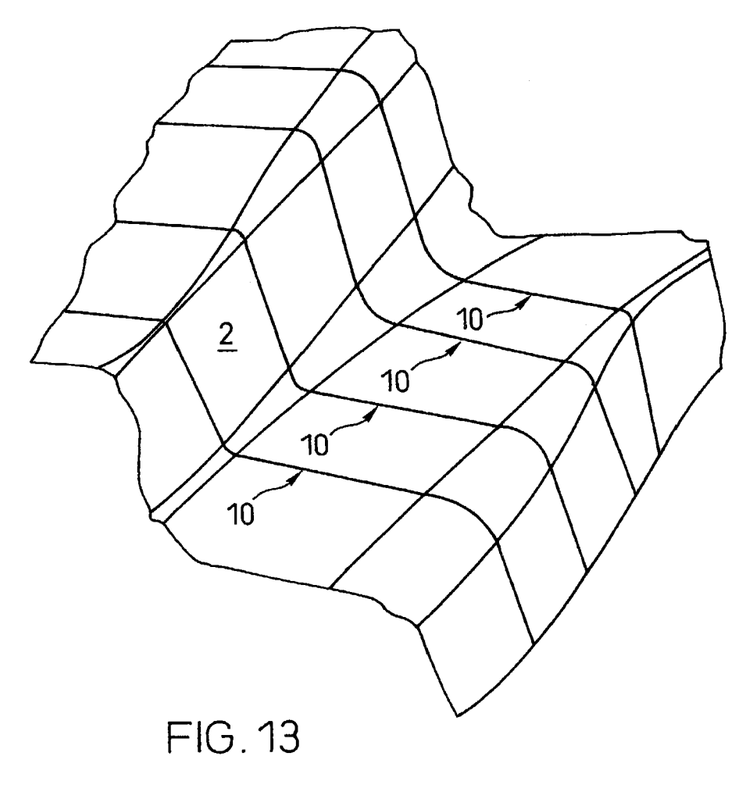
FIG. 13 illustrates the interpolation between sectional profiles.

FIG. 13 is showing in a simplified, idealistic manner a part of an addendum surface 4 and the arrangement of the sectional profiles 10 in accordance with FIG. 9. The sectional profiles are parameterised such that they are adapted to the geometry. The orientation and the distance between sectional profiles is not necessarily equal and is adapted to the course of the geometry. The sectional profiles are built such that they are corresponding to each other. Parametric values may be zero or close to zero such that single elements are not visible. The intermediate profiles are in this example indirectly interpolated: First the parametric values are interpolated, second the at least one profile is regenerated based on these interpolated values and third the surface of the addendum is built up based on these sectional profiles and, if available, intermediate sectional profiles.

What is claimed is:

1. A method to establish a parametrized process model for a forming simulation of a tool for deep drawing of a sheet metal based on a predefined component geometry, said tool comprising a die, a binder and a punch, whereby the binder is used to fix the sheet metal in an edge zone of the die, before the sheet metal is pressed in a drawing direction by a means of the punch into the die, and at least one parametrized addendum which complements the component geometry along at least one component edge, said method comprising the following steps;
   a. providing the predefined component geometry;
   b. determining a direction of drawing;
   c. providing a binder surface;
   d. creating the geometry of at least one parametrized addendum by arranging sectional profiles along the at least one component edge;
   e. spacing the sectional profiles at a distance from one another, the sectional profiles having initial directions pointing away from the component edge, whereby said initial directions are determined by adapting the direction of the sectional profiles to a course of the component geometry and avoiding overlap of the sectional profiles;
   f. connecting the sectional profiles to create addendum surfaces.

2. The method according to claim. 1, further comprising: generating at least one fill surface for smoothing of an irregular component edge to form a smoothed edge; and arranging the sectional profiles along the smoothed edge.

3. The method according to claim 2, wherein the fill surface is generated by virtual unrolling of a cylinder with a vertical axis along the edge of the component.

4. The method according to claim 1, wherein the sectional profiles do not run within a plane.

5. The method according to claim 1, further comprising: minimizing a quality criterion to determine an initial direction of a sectional profile at a certain point.

6. The method according to claim 1, further comprising: automatically generating at least one intermediate profile between two sectional profiles, wherein the intermediate profile is parameterised by profile parameters of the sectional profiles.

7. The method according to claim 6, wherein the at least one intermediate profile is interpolated indirectly from at least one profile parameter, whereby
   (a) the profile parameters of the sectional profiles are interpolated,
   (b) the at least one intermediate profile is interpolated based on the profile parameters of the sectional profiles, and
   (c) the surface of the addendum is built up based on the sectional profiles and the intermediate profiles.

8. The method according to claim 6, wherein the type of geometry of the sectional profiles is parameterised by one or more of the following parameters: component run-off length, flange length, flange angle, drawbar height, draw bar width, draw bar radius, step height, wall angle, die radius.

9. The method according, to claim 6, wherein the value of at least one of the parameters is set to zero.

10. The method according to claim 6, wherein the profile parameters of several profiles are linked to each other such that a change of one profile parameter automatically causes a change in another profile parameter.

11. A forming simulation of a tool for deep drawing of a sheet metal, wherein said forming simulation comprises a parametrized process model according to the method of claim 1, wherein several tool geometries are analyzed by changing at least one parameter of the tool model.

12. The forming simulation according to claim 11 wherein the forming simulation is optimized in an optimization loop by applying a quality criteria.

* * * * *